United States Patent [19]

Simpson

[11] 4,217,002
[45] Aug. 12, 1980

[54] SIMULATED WIRE WHEEL COVER

[76] Inventor: Lee Simpson, 220 Clovis Ave., Apt. 102, Clovis, Calif. 93706

[21] Appl. No.: 35,781

[22] Filed: May 3, 1979

[51] Int. Cl.$^3$ .............................................. B60B 7/04
[52] U.S. Cl. ........................... 301/37 CM; 301/37 SC; 301/37 SS; 301/37 S
[58] Field of Search .......... 301/37 R, 37 CM, 37 AT, 301/37 S, 37 SS, 37 SC, 108 S, 108 SC, 108 R

[56] References Cited
U.S. PATENT DOCUMENTS

| 3,967,855 | 7/1976 | Johnson | 301/37 R |
| 4,061,400 | 12/1977 | D'Angelo | 301/37 AT |

FOREIGN PATENT DOCUMENTS

| 672204 | 9/1929 | France | 301/37 SC |
| 357692 | 10/1931 | United Kingdom | 301/108 SC |
| 415681 | 8/1934 | United Kingdom | 301/37 SC |

Primary Examiner—Charles A. Marmor
Attorney, Agent, or Firm—Huebner & Worrel

[57] ABSTRACT

A simulated wire wheel cover characterized by open-ended tubular casing for receiving an end portion of a wheel-supported axle, an annular flange for mounting the casing on the wheel, a cover disk of a wire wheel configuration is concentrically related to the casing and mounted thereon, while a readily removable tamper-proof cap is provided for closing the outermost end of the casing.

4 Claims, 4 Drawing Figures

SIMULATED WIRE WHEEL COVER

BACKGROUND OF THE INVENTION

The invention generally relates to wheel covers and more particularly to a wheel cover simulating a wire wheel which is adapted to be mounted on and readily removed from wheels for trucks, trailers and the like. As used herein, the term "wheel cover" is intended to mean a decorative, protective cover for the hub and central or spoke portion of a truck wheel.

The prior art is, of course, replete with wheel covers of various shapes, sizes and designs, each intended to enhance the appearance of a wheel. However, wheel covers heretofore have been reserved for the wheels of automobiles, light trucks, such as pickup trucks, and the like, for reasons which should hereinafter become apparent.

As is generally known, wheel covers for tractor/trailer rigs and the like heretofore have not enjoyed significant usage, if at all, for reasons readily apparent in those engaged in the trucking industry. For example, large trucks frequently are utilized in inclement weather which results in the wheels being subjected to the effects of mud, snow, salt and other matter of a nature which would have a tendency to weaken or even destroy wheel covers. Parenthetically, such conditions would necessitate a frequent mounting and removal of the covers from the wheels, with an attendant loss of operational time. Additionally, it is generally accepted that it is imperative that any device attached to a truck wheel must not affect the integrity of the wheel, impair its balance, or be likely to separate from the wheel during periods of operation. Also, as a practical matter, theft and vandalism poses a real threat to the use of wheel covers for trucks and the like, particularly where a wheel cover is so fabricated as to accommodate a ready removal thereof in order to facilitate removal during inclement weather and resulting road conditions.

Moreover, as is well known, it is not uncommon to provide a live axle with an external oil gauge which requires frequent examination in order to assure a proper oil level is maintained for the axle and its associated components. Of course, such a device must readily be observable or, otherwise, its usefulness is greatly impaired.

It is, therefore, the general purpose of the instant invention to provide a wheel cover having an appearance of the spoke portion of a wire wheel which is adapted to be mounted and removed from the wheels for trucks, trailers and the like, and employed for both protective and aesthetic purposes and one which is adapted to be securely fastened to the wheel without affecting the integrity or balance of the wheel, and is not likely to be stolen by vandals or the like.

OBJECTS AND SUMMARY OF THE INVENTION

It is an object of the instant invention to provide a wheel cover simulating a wire wheel and particularly adapted to be mounted on and/or be readily removed from wheels of trucks, trailers and the like.

It is another object to provide a wheel cover which can be securely fastened to a wheel and yet accommodate its removal from the wheel in an expeditious manner.

It is another object to provide a wheel cover which is substantially vandal-proof and yet can be rapidly mounted and dismounted from a wheel.

It is another object to provide a wheel cover simulating a wire wheel for use on wheels for trucks, trailers and the like without impairing the balance and/or integrity of the wheel.

Another object is to provide a wheel cover particularly adapted to be mounted on a wheel for a truck, trailer or the like having an axle equipped with an external oil gauge.

These together with other objects and advantages are achieved through the use of a tubular casing having an inspection opening defined therein and adapted to be mounted on a wheel of a truck employing wheel mounting bolts, a cover disk adapted to be mounted on the casing and bolted thereto at one end thereof, and a removable cap mounted in covering relation with the inspection opening and secured to the casing employing tamper-proof devices, as will hereinafter become more readily apparent by reference to the following description and claims in light of the accompanying drawings.

DESCRIPTION OF THE PREFERRED EMBODIMENT

Figure 1:
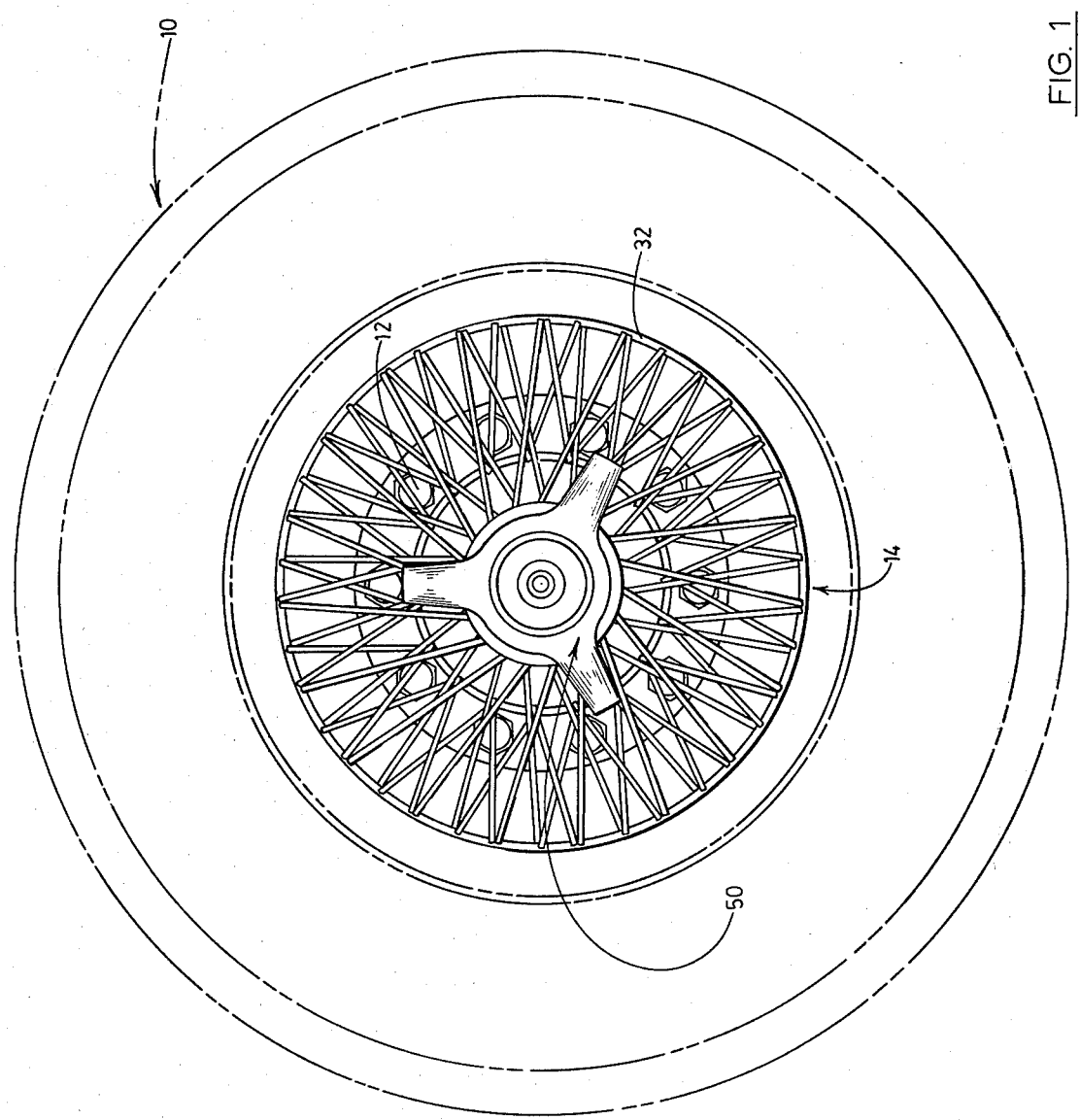
FIG. 1 is a front elevational view of a wheel having mounted thereon a wire wheel simulating wheel cover which embodies the principles of the instant invention.

Referring now to the drawings, wherein like reference characters designate like or corresponding parts throughout the several views, there is shown in FIG. 1 a wheel 10 of a type particularly adapted to be mounted on a truck, typified by a tractor/trailer rig.

It is to be understood that the details of the wheel 10 form no part of the claimed invention. Accordingly, a detailed description of the wheel 10 is omitted in the interest of brevity. However, it is at this juncture noted that the wheel 10 includes an annular array of mounting bolts, designated 12, the purpose of which is to secure the wheel 10 to an axle-supported drum or similar component part of a wheel, not shown.

Figure 3:
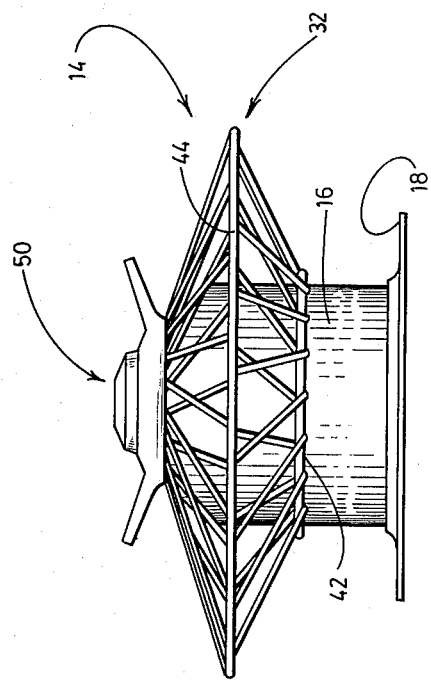
FIG. 3 is a bottom plan view of the wheel cover.
Figure 2:
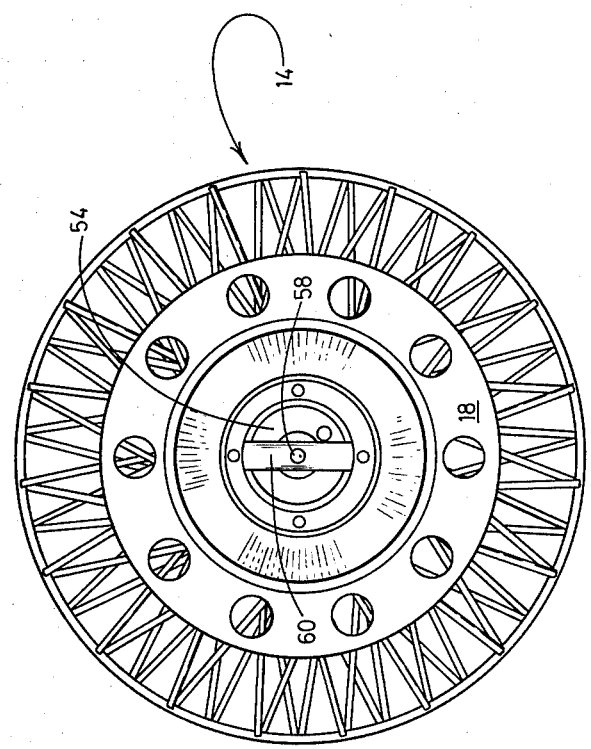
FIG. 2 is a rear elevational view of the wheel cover.
Figure 4:
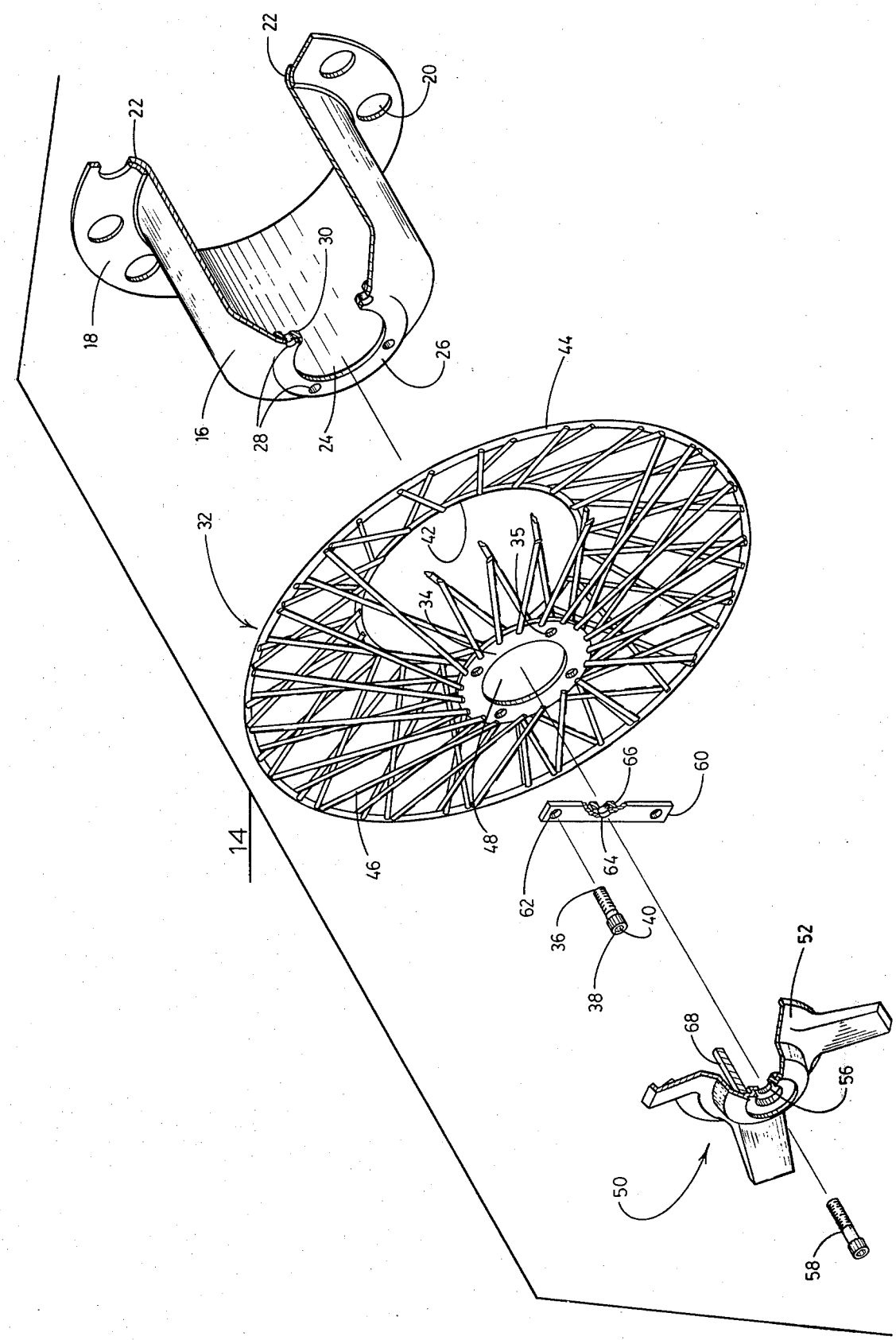
FIG. 4 is an exploded perspective view of the wheel cover.

Disposed at the center of the wheel 10 there is a wheel cover 14 so designed and configured as to impart to the wheel an appearance of a wire wheel. As best shown in FIGS. 3 and 4, the wheel cover 14 includes a casing 16 of a substantially cylindrical configuration so dimensioned as to receive in encased relation the stub end of an axle of a conventional design supported by the wheel 10. Additionally, where the axle includes an external oil gauge, the oil gauge also is encased within the casing 16. As a practical matter, the casing 16 is fabricated from suitable materials such as a metal or the like, particularly adapted for chrome plating.

Disposed at one end of the casing 16 there is a mounting flange 18 of a generally annular configuration and having an array of apertures 20 formed therein. The apertures 20 are suitably dimensioned and so spaced as to accommodate a mounting of the casing 16 on the wheel utilizing the mounting bolts 12, as the bolts are inserted for purposes of mounting the wheel 10. While the mounting flange 18 is, where so desired, formed as an integral part of the casing 16, as shown, the mounting flange 18 comprises an annulus through which the casing 16 is inserted and united therewith by means of an annular lip 22 projected radially from the casing 16 in circumscribing relation with the base end portion thereof.

As a practical matter, where so desired, the mounting flange 18 is slightly deformed at its center to define a relief within which the lip 22 is received in order to facilitate a flush mounting of the casing on the adjacent surface of the wheel 10. Like the casing 16, the mounting flange 18 also is fabricated from a metal suited for chrome plating.

Located in coaxial relation with the casing 16 at the end thereof opposite the mounting flange 18, there is an inspection opening 24 through which the adjacent end of an axle, and/or an oil gauge mounted thereon can readily be examined. Circumscribing this opening there is an annular surface 26 having a substantially planar surface lying in a plane normally related to the longitudinal axes of the casing. Defined within the annular surface 26, in uniformly spaced relation, are mounting bores 28, each terminating in an internally threaded fastener 30, such as a nut or the like, welded or otherwise rigidly affixed to the internal surface of the casing 16. Thus, the mounting bores 28, in effect, are caused to substantially conform to internally threaded bores.

Adapted to be removably mounted on the casing 16 is a wire cover disk, generally designated 32. The cover disk 32 is formed wire also suited for chrome plating and includes a first annulus 34 of a diameter substantially equal to the diameter of the annular surface 26. The first annulus includes an annular array of bores 35 so spaced and configured as to register with the bores 28. The bores 28 and 35, when aligned, accommodate insertion of a plurality of fasteners or allen cap screws, only one of which is shown, designated 36.

As is well known, allen cap screws have provided therein a socket 38 for receiving an allen wrench, as well as an axially projected protuberance 40. The protuberance is concentrically related with the socket and serves to prevent insertion of a conventional allen wrench into the socket. To apply torque to the cap screw, it is necessary to employ an allen wrench which includes a socket for receiving the protuberance in order to permit the wrench to be inserted into the socket. Thus, the allen cap screw is, in practice, considered to comprise a tamperproof fastener.

Coaxially related to the annulus 34 there is provided a second annulus, designated 42. This annulus is characterized by a diameter slightly greater than the outside diameter of the casing 16 and thereby accommodates insertion of the casing through the annulus, as best illustrated in FIG. 3.

A third annulus 44 also is provided for the cover disk 32 in coaxial alignment with the annuli 34 and 42. Preferably, the annulus 44 is disposed in a plane passing approximately midway between the annuli 34 and 42. Projected from the annulus 44 into engaged relation with the annulus 34 as well as the annulus 44 there is a plurality of spokes 46. In practice, the spokes 46 are welded to and projected from opposite surfaces of the annulus 44 and engage the annuli 34 and 44 at opposite surfaces thereof in a pattern closely conforming to the pattern of spokes for wire wheels of conventional design. Of course, the spokes 46 are welded to the annuli 34 and 42 in a manner similar to that which they are welded to the annulus 44.

It should now be apparent that the cover disk 32 is adapted to be received by the casing 16, in a concentric relationship, with the bores 28 and 35 arranged in coaxial alignment for receiving the allen cap screws 36 which, in practice, are inserted through the bores and received by the fasteners 30, whereby the cover disk 32 is securely affixed to the casing 16. Moreover, it can be seen that the annulus 34 defines an inspection opening 48 of a diameter substantially equal to the diameter of the inspection opening 24, whereby visual examination of an end of an axle, and/or an oil gauge attached thereto, readily can be examined utilizing visual techniques. However, in order to close the inspection openings 24 and 48, as well as to improve the aesthetic qualities of the wheel cover 14, a cap generally designated 50 is provided.

The cap 50, as shown, assumes the configuration of a so-called spinner commonly employed on wheels for racing vehicles and the like. However, it should be apparent that the configuration of the cap 50 is varied as desired. As shown, the cap 50 preferably includes a shell 52 having defined therein an internal cavity 54 and an axial mounting bore 56 extended therethrough for receiving an allen cap screw 58.

In order to facilitate a mounting of the cap 50 on the casing 16, there is provided a retaining bar 60 extended diametrically across the inspection opening 48 thereof and includes mounting bores 62 defined in each of the opposite ends thereof for accommodating insertion of a pair of cap screws 36. Additionally, the bar 60 includes a center bore 64, located at midsection of the bar, which, like the bores 28, terminates in a fastener 66 such as a nut welded or otherwise rigidly affixed to the bar 60 so that the bore 64 also comprises an internally threaded bore.

It should now be apparent that in order to mount the cap 50 on the wheel cover 14, it merely is necessary that the cap 50 be coaxially aligned with the annulus 34 so that the bore 56 is arranged in coaxial alignment with the bore 64, in order to accommodate insertion of the cap screw 58 through the now aligned bores 56 and 64. Like the cap screws 36, the cap screw 58 also includes a socket and protuberance, not designated, which requires insertion of an allen wrench of special design in order to apply torque to the screw 58 as the screw is advanced along the internal thread of the fastener 66.

In practice, an elongated stop 68 is disposed within the internal cavity of the cap 50 for purposes of being received in engaged relation by the bar 60, whereby rotation of the cap 50 is precluded in order to assure that the cap 50 cannot be accidentally or otherwise rotated after being mounted and secured by the cap screw 58.

In order to utilize the wheel cover 14, the casing 16 is mounted on a truck wheel employing the mounting bolts 12 which normally are employed for purposes of mounting the wheel 10. Subsequent to the mounting of the casing 16 on the wheel 10, the cover disk 32 is positioned in circumscribing relation with the casing by inserting the casing through the opening defined by the annulus 42 for purposes of causing the annulus 34 to abut the annular surface 26. The bores 35 are next aligned with the bores 28 and the retaining bar 60 positioned in diametric relation with the inspection opening 48 with the bores 62 thereof being aligned with the bores 35. Cap screws 36 are now inserted through the aligned bores 35 and torqued sufficiently for securing the retaining bar 60 and the annulus 34 in a mounted relationship with the casing 16.

Subsequently, the cap 50 is positioned in abutted relationship with the annulus 34 for purposes of aligning the bore 56 with the bore 64. A cap screw 58 next is inserted through the aligned bores 56 and 64 and torqued sufficiently for securing the cap to the casing 16.

In the event that weather, road conditions, vandalism or the like requires a removal of the cover disk 32, the cap screw 58 is extracted from the bores 56 and 64, the cap 50 removed, and, subsequently, the cap screws 36 are then removed from the bores 35 and 28. The next step requires a simple axial removal of the cover disk from the casing 16. Where so desired, the retainer bar 60 is again positioned across the inspection opening 24 and secured in place through the use of the cap screws 36 extended through the bores 62 and received by the fasteners 30 in secured relation. Next, the cap 50 is brought into coaxial alignment with the inspection opening 24, as before, the allen cap screw 58 inserted through the bore 56 and threaded into the bore 64 for purposes of securing the cap in place on the casing. Thus, a rapid dismounting of the cover disk 32 is facilitated.

In view of the foregoing, it should now be apparent that the wheel cover embodying the principles of the instant invention provides a practical solution to problems heretofore encountered when attempting to employ wheel covers, particularly those of a decorative nature, for wheels of trucks typified by tractor/trailer rigs.

Having described my invention, what I claim as new and desire to secure by Letters Patent is:

1. A wheel cover simulating a wire wheel particularly adapted to be mounted on and readily removed from wheels for vehicles including trucks, trailers and the like comprising:
    A. means for encasing one end of a wheel-supported axle including a casing of a cylindrical configuration having an annular flange defined at one end thereof characterized by an array of apertures defined therein for receiving bolts employed in connecting a wheel to the axle;
    B. a cover disk concentrically related to said casing comprising means defining a first and a second annulus arranged in coaxial alignment, said first annulus being characterized by a diameter slightly less than the diameter of said casing and said second annulus being characterized by a diameter slightly greater than the diameter of the casing, a third annulus having a diameter greater than the diameter of said second annulus circumscribing said casing and disposed in a plane projected between the first and second annuli and a plurality of wire spokes projected from said third annulus into engaged relation with the first and second annuli and affixed thereto; and
    C. fastening means for fastening the cover disk to the casing comprising a first annular array of bores defined in the end of the casing opposite said one end, a second annular array of bores defined in the first annulus disposed in registry with the first array of bores and a plurality of screws extended through the bores of said first and second array of bores, and fastener means for securing the screws in the bores.

2. A wheel cover as defined in claim 1 wherein the fastener means comprises a plurality of fasteners affixed to the casing, and the cover disk further comprises a cap mounted on the first annulus in covering relation therewith.

3. A wheel cover as defined in claim 2 further comprising:
    a retainer for supporting the cap including a bar diametrically related to said first annulus having an internally threaded bore defined in the center portion thereof and a pair of bores defined in the end portions of the bar receiving a pair of the screws of said plurality of screws, and means for releasably mounting the cap on the bar including an allen head cap screw projected through the center of the cap and received by the internally threaded bore defined in said bar.

4. A wheel cover as defined in claim 3 wherein each of the screws comprises an allen cap screw.

* * * * *